US008828447B2

(12) United States Patent
Soerensen et al.

(10) Patent No.: US 8,828,447 B2
(45) Date of Patent: Sep. 9, 2014

(54) PROCESS FOR THE ISOLATION OF A PHOSPHOLIPID

(75) Inventors: Hans Otto Soerensen, Esbjerg N. (DK); Nils Christian Jensen, Bramming (DK)

(73) Assignee: Polar Amega A/S, Esbjerg (DK)

( * ) Notice: Subject to any disclaimer, the term of this patent is extended or adjusted under 35 U.S.C. 154(b) by 0 days.

(21) Appl. No.: 14/110,525

(22) PCT Filed: Apr. 13, 2012

(86) PCT No.: PCT/DK2012/050124
§ 371 (c)(1),
(2), (4) Date: Oct. 8, 2013

(87) PCT Pub. No.: WO2012/139588
PCT Pub. Date: Oct. 18, 2012

(65) Prior Publication Data
US 2014/0031569 A1 Jan. 30, 2014

(30) Foreign Application Priority Data
Apr. 14, 2011 (EP) .................................. 11162366

(51) Int. Cl.
| A61K 35/60 | (2006.01) |
| A23L 1/30 | (2006.01) |
| A23J 7/00 | (2006.01) |
| C11B 7/00 | (2006.01) |
| A23D 9/00 | (2006.01) |
| C11B 3/00 | (2006.01) |
| C11B 1/10 | (2006.01) |
| A23D 9/04 | (2006.01) |

(52) U.S. Cl.
CPC ............. *C11B 7/0225* (2013.01); *A23L 1/3008* (2013.01); *A23J 7/00* (2013.01); *C11B 7/0016* (2013.01); *A23D 9/00* (2013.01); *C11B 3/006* (2013.01); *C11B 1/10* (2013.01); *A23D 9/04* (2013.01)
USPC .......................................... 424/523; 424/538

(58) Field of Classification Search
USPC ................................. 424/523, 538
IPC ........................................... A61K 35/60,35/612
See application file for complete search history.

(56) References Cited

U.S. PATENT DOCUMENTS 4,554,107 A * 11/1985 Takao ........................... 554/212
4,584,141 A 4/1986 Paulitz et al.
(Continued)

FOREIGN PATENT DOCUMENTS

CN 102246979 A * 11/2011
EP 0 269 277 A2 6/1988
(Continued)

OTHER PUBLICATIONS

International Search Report (mailed Jan. 25, 2013) and International Preliminary Report on Patentability (completed Aug. 6, 2013) for PCT/DK2012/050124; ISA/IPEA/EP.

(Continued)

*Primary Examiner* — Chris R Tate
(74) *Attorney, Agent, or Firm* — Harness, Dickey & Pierce, PLC

(57) ABSTRACT

The present invention relates to processes for the isolation of a phospholipid and for producing a polyunsaturated, long-chain fatty acids (PUFA)-enriched fraction from a fish oil comprising the steps of —providing a fish oil containing lipids and phospholipids; —mixing the fish oil with a polar solvent; —centrifuging the mixture of the fish oil and the polar solvent to separate a polar fraction from a lipid fraction; —isolating a phospholipid from the polar fraction or isolating a PUFA-enriched fraction from the polar fraction. The fish oil may be provided by —extracting a fish material with an extractant solvent; —removing the extractant solvent to provide the fish oil; —optionally subjecting the fish oil to a solid-liquid separation. The isolated phospholipids and PUFA's may be used as additives for functional foods, as a dietary supplement and for pharmaceutical application.

20 Claims, 3 Drawing Sheets

(56) References Cited

U.S. PATENT DOCUMENTS

| | | | |
|---|---|---|---|
| 5,928,696 A * | 7/1999 | Best et al. | 426/417 |
| 6,172,247 B1 | 1/2001 | Copeland et al. | |
| 6,372,460 B1 | 4/2002 | Gladue et al. | |
| 2005/1297390 | 6/2005 | Kohn et al. | |
| 2006/1105210 | 5/2006 | Heise et al. | |
| 2008/0274203 A1 * | 11/2008 | Bruheim et al. | 424/522 |
| 2010/0226977 A1 * | 9/2010 | Tilseth | 424/456 |
| 2012/0149867 A1 * | 6/2012 | Bruheim et al. | 530/300 |

FOREIGN PATENT DOCUMENTS

| | | |
|---|---|---|
| GB | 414 717 A | 8/1934 |
| GB | 2 462 054 A | 1/2010 |
| JP | 2006-311853 A | 11/2006 |
| JP | 2008-044907 A | 2/2008 |
| JP | 2008-255182 A | 10/2008 |
| WO | WO-00/23456 A1 | 4/2000 |
| WO | WO-2001/076385 A1 | 10/2001 |
| WO | WO-03/011873 A2 | 2/2003 |
| WO | WO-2006/106325 A1 | 10/2006 |

OTHER PUBLICATIONS

European Search Report for Priority Application EP 11 162 366.6, completed Sep. 9, 2011.

* cited by examiner

PROCESS FOR THE ISOLATION OF A PHOSPHOLIPID

CROSS-REFERENCE TO RELATED APPLICATIONS

This application is a 371 U.S. National Stage of International Application No. PCT/DK2012/050124, filed Apr. 13, 2012, and claims priority to European Patent Application No. 11162366.6, filed Apr. 14, 2011, the disclosures of which are herein incorporated by reference in their entirety.

FIELD OF THE INVENTION

This invention relates to processes for the isolation of phospholipids and for producing a polyunsaturated, long-chain fatty acids (PUFA)-enriched fraction from marine products. Marine phospholipids, in particular those comprising long chain omega-3 fatty acids, such as eicosapentaenoic acid (EPA) and docosahexaenoic acid (DHA), are useful as additives for functional foods, as a dietary supplement and for pharmaceutical application. Marine phospholipids may provide beneficial effects to the health of both humans and animals.

PRIOR ART

In recent years phospholipids comprising polyunsaturated fatty acids have been found to play important roles in physiology. Phospholipids have therefore attracted much attention as candidate materials for functional foods and in pharmaceutical applications.

Phospholipids are found in many sources of biological material, such as plant material or matter derived from animals. Marine animals comprise a particular promising source of phospholipids due to the specific composition of these phospholipids, in particular the amount of PUFA's, such as omega-3 fatty acids, e.g. eicosapentaenoic acid (EPA), docosahexaenoic acid (DHA) and docosapentaenoic acid (DPA), in marine phospholipids is large.

Phospholipids typically comprise a central glycerol moiety with two fatty acid chains and a phosphate group that may be further derivatised. Phospholipids are composed of the following major structural units: fatty acids, glycerol, phosphoric acid, amino alcohols, and carbohydrates. Phospholipids may also be referred to as polar lipids, and in the context of this application the terms "phospholipid" and "polar lipid" may be used interchangeably. Phospholipids are generally considered to be structural lipids, playing important roles in e.g. the structure of the membranes of plants, microbes and animals. Examples of phospholipids are phosphatidyl choline, phosphatidyl ethanolamine, phosphatidyl inositol, phosphatidyl serine, phosphatidylglycerol, diphosphatidylglycerols. Because of their chemical structure, phospholipids have a bipolar nature, exhibiting solubility or partial solubility in both polar and non-polar solvents.

One important characteristic of marine phospholipids is that they commonly contain PUFA's with two or more unsaturated bonds, in particular with four or more unsaturated bonds. The lipid moieties of phospholipids are commonly of the omega-3 type, which often exhibit enhanced stability, e.g. oxidative stability, when incorporated into phospholipids.

Several methods exist in the prior art to extract and isolate phospholipids from raw materials. Such methods typically involve solvent extraction coupled with additional unit operations. Several examples of prior art processes are provided below.

WO2001/76385 discloses a process for the production of polar lipid-rich materials, e.g. phospholipids, from biomaterials that are rich in polar lipids with highly unsaturated fatty acids, i.e. fatty acids with four or more unsaturated bonds. Appropriate biomaterials for the process of WO2001/76385 include fish, crustaceans, microbes, eggs, brain tissue, milk, meat and plant material including oilseeds. Egg yolks are considered the primary commercial source of polar lipids rich in highly unsaturated fatty acids.

The process of WO2001/76385 comprises extracting polar lipids from the biomaterial using a water-soluble organic solvent (e.g. an alcohol) at a concentration of water soluble organic solvent of at least 68% in water. Denatured protein, which is not soluble in high concentrations of water-soluble organic solvent, is then separated by density separation, such as using gravity or centrifugal force, as a precipitate. The polar lipid/oil enriched liquid fraction may then be mixed with water to a final concentration of water-soluble organic solvent in water of from 5 to 35% to precipitate polar lipid, and polar lipid is then separated from the oil by means of density separation. An exemplary unit operation for density separation in WO2001/76385 is a decanter centrifuge.

U.S. Pat. No. 6,372,460 discloses a method to provide a DHA phospholipid material, in particular from algae and other single celled organisms that contain a significant amount of DHA. In an example dried biomass (an alga) is extracted with hexane to provide a DHA-rich hexane fraction, which is centrifuged to remove fine particles. DHA-phospholipids are then precipitated chemically and the DHA-phospholipids subsequently collected by centrifugation.

JP2006-311853 discloses a method for producing a phospholipid composition from fish and shellfish. It is a particular concern of JP2006-311853 to provide a phospholipid composition free of heavy metals, such as cadmium. In the process of JP2006-311853 the starting material, e.g. fish waste is boiled with water. The boiled material is then separated into a solid and a liquid phase using centrifugal separation and/or filtration. The solid phase is then subjected to an organic solvent extraction process. The organic solvent may be methanol, ethanol, propanol, butanol, acetone, chloroform, methylene chloride, hexane or aqueous acetone. The organic solvent is then removed from the extract, now free of heavy metals, which is subjected to chromatographic purification.

JP2008-255182 describes a process for producing a phospholipid composition from an edible source, such as an edible portion and internal organs of fish and shellfishes. In the process of JP2008-255182 the starting material is initially heated with micro-waves to inactivate enzymes that may otherwise hydrolyse the phospholipids of interest. The heat-treated material is then extracted with a solvent, such as ethanol, hexane or acetone with ethanol being preferred.

JP2008-044907 provides the manufacture of phospholipid from solvent extraction of fish with the aim of improving the quality of the obtained phospholipid. The fish material is extracted with a non-polar solvent, e.g. hexane, heptane, isooctane, or benzene, a polar solvent, for example, methanol, ethanol, isopropanol, diethylether, ethyl acetate, acetone or a mixture of a non-polar solvent and a polar solvent, in particular a mixture of hexane and ethanol. The solvent is then removed from the extract, and the obtained fraction is then purified using adsorption filtration on diatomaceous earth.

WO2000/23456 discloses a method for extraction of lipid fractions from marine and aquatic animals, e.g. krill or fish. The method comprises suspending marine and aquatic material in a ketone such as acetone to extract lipids. The extraction may be carried out by successive acetone and alcohol treatments, e.g. using isopropanol or t-butanol, and the extraction should be performed at a temperature of about 5° C. or less. The solubilised lipid fractions may then be separated from the solid material by techniques such as filtration, centrifugation or sedimentation, with filtration being preferred. It appears from WO2000/23456 that the method disclosed therein may provide a fraction enriched in phospholipids. The method of WO2000/23456 is used specifically for extraction of phospholipids derived from natural marine or aquatic sources in WO2003/011873.

WO 2006/106325 discloses processes for the production of phospholipid compositions, e.g. marine phospholipids. One process of WO 2006/106325 comprises extracting a fish meal with an organic solvent to produce a lipid-containing liquid, and subjecting the liquid to microfiltration. The organic solvent may be a solvent in which phospholipids and triglycerides are soluble, such as hexane, isohexane, cyclohexane or heptane. According to WO 2006/106325 phospholipids aggregate into large molecular weight micellar structures in the non-polar alkane solvent, whereas all neutral lipids are dissolved in molecular disperse solution. The phospholipid micelles are considered too big to diffuse across microfiltration membranes having pore sizes of 0.1 to 0.5 µm, and phospholipids can therefore be isolated in this process.

In another process of WO 2006/106325 the alkane solvent extract may be subjected to solvent stripping and the extract or residue may be contacted with a second solvent in which neutral lipids are more soluble than polar lipids whereby to precipitate a phospholipid composition. The second solvent may be supercritical carbon dioxide, propane, carbon dioxide/propane mixtures, ethanol/water mixtures or ketones with acetone being preferred.

Several processes are known for separating phospholipids from oils of plant origin. However, the content of phospholipids in plant oil is typically different from that of fish oil. Thus, for example a plant oil may contain from 0.5 to 3% phospholipids whereas the content in fish oil will normally be below 0.5%, e.g. close to 0%. Furthermore, the lipid composition of a fish oil will also be different from the lipid composition of a plant oil. For example, plant oils such as olive oil, rape seed oil and linseed oil do not contain omega-3 acids containing more than 18 carbon atoms, whereas phospholipids containing fatty acids with more than 18 carbon atoms, e.g. EPA (20 carbon atoms) and DHA (22 carbon atoms) are found in fish; these PUFA's are of particular interest. Moreover, in the processing of a plant oil the aim is typically the complete separation of oil from phospholipids without regard to keeping the phospholipids intact. Thus, plant phospholipids, "lecithins", are commonly hydrolysed using e.g. acid or enzymes, in order to make them hydrophilic to ease their removal from plant oils.

U.S. Pat. No. 4,584,141 discloses a modified conventional degumming process for removing impurities from triglyceride oils. Exemplary oils are plant oils, e.g. sunflower oil and soybean oil, although the process is also suggested for use with safflower oil, cottonseed oil, grapeseed oil, corn oil, rapeseed oil, rice bran oil, tallow and fish oil. In the process of U.S. Pat. No. 4,584,141 the oil is mixed with hydrolysed phosphatide and water before separating the oil into an oil portion and a sludge portion and separating the sludge portion into an aqueous phase and an oil phase. U.S. Pat. No. 4,584,141 thus requires addition of hydrolysed phospholipid, and it is therefore not suitable for isolating phospholipids as a product.

U.S. Pat. No. 6,172,247 relates to methods for refining vegetable oils and byproducts thereof. The process for refining vegetable oil uses organic acid, for example to produce a refined vegetable oil with improved odour, flavour, and storage stability, and a reduced content of e.g. free fatty acids and phosphatides. The process involves admixing a dilute aqueous organic acid solution with a heated stream of crude vegetable oil to give an acid-oil blend and separating a hydrated impurities phase and a purified vegetable oil phase. The hydrated impurities phase is a phosphatide concentrate and comprises hydrolysed lecithin. U.S. Pat. No. 6,172,247 further discloses a "Lecithin Deodorizing" process comprising adding hydrogen peroxide to the hydrolysed lecithin fraction. U.S. Pat. No. 6,172,247 require as a minimum addition of organic acid or hydrogen peroxide to provide the advantages of the processes, and it is not disclosed how intact phospholipids may be isolated, and further U.S. Pat. No. 6,172,247 is limited to plant oils.

US2006/110521 relates to non-hydrogenated or partially hydrogenated non-animal oils, and US2006/110521 discloses processes for their preparation. The oil is prepared in the steps of preparation, cracking and dehulling, conditioning, milling, flaking or pressing, extracting, degumming, refining, bleaching and deodorising. Oil extraction may be performed using a solvent, such as n-hexane or isohexane, and degumming to remove the hydratable phosphatides is performed by adding water and heating. The process of US2006/110521 is however considered ill-suited for treating fish since these contain significant quantities of EPA and DHA.

US2005/129739 suggests that phospholipids can be recovered from fish, microalgae, or fungi through a physical or chemical degumming process. However, the degumming process is not disclosed, and further the only processes for oil extraction discussed in US2005/129739 are for extraction from plant material.

EP 0269277 discloses a process for degumming triglyceride oils for removing phospholipids or gums from the oils. The object of EP 0269277 is to produce an oil product with a reduced phosphorus content in the oil, and this is achieved by dispersing in the oil an organic acid or acid anhydride, at a temperature not greater than about 40° C., subsequently dispersing water in the oil, while maintaining this temperature, and then separating a sludge containing the gums from the oil. In the treatment according to EP 0269277 the phospholipids in the oil will be hydrolysed and hydrated by the process, and therefore the process is not suited for extracting intact phospholipids.

In light of the above there is a need for a robust and scaleable process capable of processing large amounts of raw material to obtain a phospholipid product. In particular, there is a need for an efficient process to isolate phospholipids and to provide a PUFA-enriched product from raw material derived from fish. The present invention addresses these points.

DISCLOSURE OF THE INVENTION

The present invention relates to a process for the isolation of a phospholipid from a fish oil. The process comprises the steps of:
provideing a fish oil containing lipids and phospholipids;
mixing the fish oil with a polar solvent;
centrifuging the mixture of the fish oil and the polar solvent to separate a polar fraction from a lipid fraction;
isolating a phospholipid from the polar fraction.

In another aspect the invention relates to a process for producing a polyunsaturated, long-chain fatty acids (PUFA)-enriched fraction from a fish oil comprising the steps of:
providing a fish oil containing PUFA's;
mixing the fish oil with a polar solvent;

centrifuging the mixture of the fish oil and the polar solvent to separate a polar fraction from a lipid fraction;

isolating a PUFA-enriched fraction from the polar fraction.

In certain embodiments of the processes, the step of providing the fish oil comprises:

extracting a fish material with an extractant solvent;

removing the extractant solvent to provide the fish oil;

optionally subjecting the fish oil to a solid-liquid separation.

Any fish oil is appropriate for the processes as long as the fish oil contains both lipids and phospholipids and/or PUFA's, and the fish oil may be obtained from any species of fish. In this context, the term "fish" covers both vertebrate and invertebrate species of marine animals, such as fish, molluscs, e.g. octopuses, squid and cuttlefish, or crustaceans, e.g. krill, shrimps, crabs, lobsters, mantis shrimp, woodlice, sandhoppers. Fish of particular relevance comprise sand eel (*Hyperoplus* sp., *Gymnammodytes* sp. or *Ammodytes* sp., e.g. *Hyperoplus lanceolatus*), sprat (*Sprattus sprattus*), herring (*Clupea* sp., e.g. *Clupea harengus*), anchovy (*Engraulis* sp., e.g. *Engraulis ringens*), boarfish (*Capros aper*), Norway pout (*Trisopterus esmarkii*), Capelin (*Malotus villosus*), Blue Whiting (*Micromesistius poutassou*), and Jack Mackerel (*Trachurus murphyi*). Certain embodiments of the invention employ a fish material. The term "fish material" is to be understood broadly and may comprise any material derived from a fish as defined in the invention. The fish material may especially be any material derived from fish meal production. The fish material may also be derived from fish which has not been subjected to heat treatment; for example the fish material may be fish waste or the like from the production of fish for human consumption.

Any type of phospholipid from fish is relevant for the present process, and the term phospholipid within the present description is not limited to natural polar lipids but also includes chemically modified polar lipids. Phospholipids containing PUFA's are of particular interest in the present invention. The process of the invention is especially suitable for the isolation of an intact phospholipid. In particular the phospholipid is not hydrolysed in the process, and in certain embodiments of the invention no additive, which may hydrolyse a phospholipid is added in the process. Relevant compounds that may hydrolyse a phospholipid comprise acids, e.g. phosphoric acid, organic acids, e.g. citric acid, acid anhydrides, hydrogen peroxide, and enzymes, e.g. lipases and phospholipases. The intact phospholipid comprising both fatty acid chains and the phosphate group attached to the central glycerol moiety will stabilise PUFA's, in particular EPA and DHA, from degradation, such as oxidative degradation. Furthermore, in other embodiments no surfactant is added in the process.

The fish oil may be obtained using any available process although the fish oil may advantageously be obtained according to the invention. When the phospholipids are obtained according to the invention the contents of contaminants, such as heavy metals, e.g. lead, cadmium, pesticides and pesticide break-down products, e.g. toxaphen, chlordan, DDD, DDE, DDT, endosulfan, endrin, heptachlor, hexachlorobenzene (HCB), hexachlorocyclohexane (HCH), other harmful compounds, e.g. dioxins, polychlorinated biphenyls (PCBs), persistent organic pollutants (POPs) will be reduced. Thus, when a fish material is processed according to the invention the isolated phospholipids will contain unwanted contaminants in amounts acceptable for use in food products for humans or animals.

Any polar solvent can be used in the invention. Importantly, the polar solvent should be able to extract phospholipids from the fish oil. The polar solvent is selected such that it is immiscible with the fish oil, so that addition of the polar solvent to the fish oil will create a two-phase system. A preferred polar solvent is water.

Phospholipids may be found in a micellar form with the polar "head" facing the centre of the micelle or facing the solvent depending on the polarity of the solvent. In particular, the phospholipids may have a "critical micelle concentration" or CMC, so that when the phospholipids are present above this concentration in a solvent they will form micelles with the type of micelles depending on the polarity of the solvent. For example, when present in a polar solvent above the CMC the phospholipids will form micelles with the polar moiety facing the polar solvent. Below the CMC the phospholipids may be found in a generally dissolved form in either of a polar or an apolar solvent. The present inventors have now surprisingly found that when a fish oil containing phospholipids and/or PUFA's is mixed with a polar solvent it is possible to preferentially extract the phospholipids and/or PUFA's to the polar solvent in a micellar form by carefully considering the ratio of polar solvent to fish oil and the nature of the polar solvent. The amount of polar solvent should be sufficient for the phospholipids to form micelles, and it will depend on the amount of phospholipids and free fatty acids. This allows that the phospholipids, and thereby also PUFA's, are extracted and isolated from the fish oil; in particular, the simple nature of the extraction, i.e. mixing a fish oil and a polar solvent, allows the process to be used in industrial scale. Furthermore, the invention allows that a fish oil fraction may be enriched in PUFA's, e.g. EPA and DHA, since these are common among the fatty acids chains of phospholipids in fish oil. The processes of the invention may further comprise analysing the polar fraction or the concentrated polar fraction for the presence of an excess of polar solvent, e.g. excess relative to the formation of phospholipid micelles. The analysis may be used to control, e.g. adjust, the amount of polar solvent used in the upstream polar solvent extraction. This is especially useful when the process is performed under continuous operation. The ratio of polar solvent to fish oil will generally be about 5:95 to about 25:75, although it is also possible to use an excess of polar solvent to fish oil. Using an excess of polar solvent evidently requires larger volumes of solvent and therefore using the ratio of about 5:95 to about 25:75 is especially advantageous in an industrial process since smaller scale equipment, e.g. centrifuges, can be employed. The reduced process volumes and the smaller scale equipment allow faster processing of the fish oil as less polar solvent has to be separated from the fish oil. Furthermore, by careful choice of the ratio of polar solvent to fish oil it is possible to minimise the amount of fish lipids trapped in the phospholipid micelles and thereby increase the purity of the phospholipids in the polar fraction.

Certain embodiments of the invention comprise a second extraction with the polar solvent. Thus, the process may further comprise the steps of:

mixing the polar fraction with the polar solvent and fish oil;

separating the mixture of the polar fraction, the polar solvent and the fish oil into a concentrated polar fraction and a lipid fraction. The separation is preferably a centrifugation. The concentrated polar fraction may also be analysed for the presence of an excess of polar solvent as described above. In general, the same considerations as for the first extraction with the polar solvent apply. However, in this second extraction fish oil, e.g. fish oil which has not been treated according to the invention or fish oil which has been extracted from fish material with an extractant solvent according to the invention, is added, e.g. simultaneously, with the polar solvent to the polar fraction. The ratio of polar solvent to the polar fraction and the fish oil will generally be up to about 5% polar solvent, e.g. about 1% to about 4%, preferably about 2%; about 25% to about 75%, e.g. about 40% to about 60%, preferably about 50% fish oil and polar fraction to balance. This second extraction allows that a higher concentration of phospholipids can be obtained in the concentrated polar fraction compared to the polar fraction from the first polar solvent extraction. In particular, the polar fraction from the first polar solvent extraction will be enriched in phospholipids and the higher concentration of phospholipids is advantageous in sequestering further phospholipids from the additional, untreated fish oil added in the second polar solvent extraction. Thus, the second polar solvent extraction will provide a synergistic concentrating effect on phospholipids and PUFA's in the combined treated and untreated fish oil to provide an even higher concentration of phospholipids and PUFA's in the products obtained after removal of the polar solvent. For example, aqueous extraction of a fish oil provided from an ethanol-extracted fish material may yield a phospholipid product from the polar fraction with a phospholipid content of 15% and a content of EPA+DHA of about 25-30%. The second aqueous extraction may yield a phospholipid product from the concentrated polar fraction with a phospholipid content of 40% and a correspondingly increased content of EPA+DHA.

Several steps of the processes of the invention may comprise a centrifugation. In the context of the invention the term "centrifugation" and derived forms include any type of centrifugation, in particular using centrifuges suited for industrial scale of operation, e.g. disk stack centrifuges, decanter centrifuges, solid bowl centrifuges etc.

The transfer of the phospholipids and PUFA's from the fish oil to the polar solvent may take place instantaneously when the polar solvent is mixed with the fish oil, or the mixing step may have any duration as desired.

In certain embodiments it may be necessary to physically mix the polar solvent with the fish oil. For example, the mixing may be performed in a vessel equipped with a stirring blade, an impeller, a Rushton turbine, a propeller or the like, or the mixing vessel may otherwise be fitted to agitate the mixture of the fish oil with the polar solvent. In particular, when the mixture of the fish oil with the polar solvent is physically mixed this generally involves subjecting the mixture to shear stress.

The mixing may take place at any temperature at which the polar solvent is liquid, e.g. the temperature may be decreased below ambient temperature, the mixing may take place at ambient temperature or the temperature may be increased during mixing. A high temperature will generally allow that the phospholipids are extracted at a higher rate than when the extraction is performed at a lower temperature. The temperature may thus be increased to any value below the boiling point of the polar solvent. In other embodiments, the mixing may take place at a decreased or at ambient temperature. In yet further embodiments, the temperature may be increased or decreased from the initial mixing temperature so that the temperature is changed during the mixing.

Following extraction of the phospholipids and PUFA's from the fish oil in the mixing step the mixture of the fish oil with the polar solvent is centrifuged to separate the two phases, i.e. the polar fraction comprising the phospholipids from the lipid fraction comprising other lipids from the fish oil. The centrifugal separation may be performed at an increased temperature. Any industrial centrifuge may be employed, e.g. a disk stack centrifuge, a decanter centrifuge, a solid bowl centrifuge. The separation of the two phases may advantageously be performed in a disk stack centrifuge. The centrifugal separation will provide a polar fraction with phospholipids and also a fish oil product depleted in phospholipids; another aspect of the invention relates to the phospholipid-depleted fish oil product obtainable in the process of the invention. In further embodiments of the processes the polar fraction is subjected to a second centrifugal separation, e.g. in a disk stack centrifuge, to concentrate the phospholipids and PUFA's further.

The polar solvent fraction, or phase, from the centrifugal separation comprises the phospholipids and PUFA's, and in the process of the invention the phospholipids are isolated from the polar solvent fraction. Likewise, a PUFA-enriched fraction may be isolated from the polar fraction. The isolation may comprise any appropriate method, such as evaporation of the polar solvent, distillation, e.g. vacuum distillation, of the polar solvent, or the phospholipids and/or PUFA's may be isolated adsorptively, e.g. using a chromatographic membrane or matrix or an adsorptive material such as diatomaceous earth, or the phospholipids may be isolated using nano- or ultrafiltration. In the context of the invention "vacuum distillation" generally refers to a unit operation where heat is applied to the polar fraction with the simultaneous lowering of the pressure above the polar fraction in order to drive out the polar solvent from the polar face with the phospholipids. The term may also be used in the context of removal of an extractant solvent. Furthermore, the heat applied may be moderate, e.g. to a maximum of about 40° C. to avoid heat modification of phospholipids. The phospholipids may be further dried, e.g. by subjecting the phospholipids to additional heat treatment, optionally at a decreased pressure. Removal of polar solvent and drying of the phospholipids may be performed in the same operation.

In another aspect the invention relates to the phospholipids obtainable in the process of the invention. In yet another aspect the invention relates to the PUFA's obtainable in the process of the invention.

In a specific embodiment of the process of the invention the fish oil is provided by extracting lipids and phospholipids, i.e. "fish oil", from a fish material as described above. Appropriate fish materials are fish meal, optionally in the form of pellets, presscake, e.g. from fish meal production, unprocessed fish, whole fish, specific parts of fish, such as skin, bone, meat, organs, e.g. fish liver, or fish waste etc.; in particular, the "fish material" may be a material derived from fish at any stage in the production of fish meal or the fish material may be derived from fish at any stage in the production of fish for human consumption. The fish material is extracted with an extractant solvent. Any solvent capable of extracting lipids including phospholipids is contemplated for use in the invention. The extractant solvent may be polar or apolar. Relevant apolar solvents comprise hydrocarbon solvents. The extractant solvent may also be supercritical carbon dioxide. Apolar solvents, such as hexane, e.g. isohexane, are preferred as extractant solvent in some embodiments. Other embodiments employ ethanol or ethanol-water-mixtures as extractant solvent.

The extraction will generally involve contacting a fish material with the extractant solvent. In a specific embodiment the fish material is a fish meal, e.g. in the form of pellets, although the fish meal may also be extracted without prior pelletisation. In another embodiment, the fish material is a presscake from fish meal production, and in yet another embodiment whole fish or parts of fish are extracted with the extractant solvent. The fish material, e.g. fish meal, or fish meal pellets, is mixed with the extractant solvent, and the extraction with the extractant solvent may be performed under application of shear stress to the mixture of the fish material and the extractant solvent, for example using a stirring blade, an impeller, a Rushton turbine, a propeller or the like. The duration of the extraction step may be selected freely, e.g. the extraction may take place instantaneously, or the extraction may have a duration up to e.g. 24 hours. The extraction may advantageously be performed as a continuous process.

The extraction with the extractant solvent may be performed at ambient temperature or lower, or the temperature may be increased during the extraction, e.g. to any temperature up to the boiling point of the extractant solvent. In general, an increased temperature will result in a faster extraction of the phospholipids and PUFA's and lipids from the fish material. Ambient temperature or lower may be employed when it is of interest to ensure that the phospholipids and PUFA's are not modified by exposure to high temperature.

After the extraction with the extractant solvent it may be desirable to remove the extracted fish material from the extract. The extracted fish material will generally comprise particulate material of a relatively large size, e.g. from sub-millimeter up to the size of the pellets, if applicable. Any solid-liquid unit operation capable of separating such particulate from the extractant solvent may be applied to remove the extracted fish material from the extract. For example, the extracted fish material may be removed from the extract using sieving, filtration or centrifugation. In a further aspect the invention relates to the extracted fish material obtainable in the process.

The extractant solvent is removed from the extract following the extraction. Any appropriate method may be used to remove the extractant solvent, such as distillation, e.g. vacuum distillation, or evaporation. The extractant solvent removed from the extract may be recycled in the process to be added to and contacted with a further portion of fish material or fish material pellets. This allows for an efficient continuous processing of fish material to isolate phospholipids.

The fish oil resulting from the removal of the extractant solvent may be subjected to a solid-liquid separation prior to processing to isolate phospholipids as described above. Any solid-liquid unit operation may be employed, although filtration is preferred. In a further aspect the invention relates to a protein product obtainable by filtration of the extract.

The embodiments of the process of the invention disclosed above may advantageously be performed under continuous operation. An advantage of continuous operation is hygiene since all process steps may be carried out in closed systems to prevent contamination from air or operators. Furthermore, the stability of the product, e.g. phospholipids and PUFA's, is improved since storage in tanks and the like is minimised in a continuous process. Continuous operation is particularly advantageous since it allows efficient processing of large quantities of material, e.g. in the order of hundreds of tonnes. Efficient processing of such quantities of material is particularly relevant for isolating a product from a starting material where the product is present in low amounts, such as isolating phospholipids from fish material. Furthermore, when the process steps allow continuous operation simple integration of the process steps in a process train of industrial scale is possible.

Thus, in yet a further aspect the invention relates to an integrated continuous process for producing a product from a fish material, such as a fish meal or fish meal pellets. The product may be a phospholipid product or a PUFA-product. The term "integrated" is to be understood broadly, but it especially refers to a situation where a process stream, such as a waste stream, e.g. a stream of solvent, e.g. extractant solvent or polar solvent, removed from a process step is recycled in an earlier, or upstream, process step. For example, in this process the fish material is extracted with an extractant solvent as described above, before removal of the extractant solvent likewise as described above. The removed extractant solvent may be recycled in the process, although further extractant solvent may also be added to retain the mass balance of extractant solvent in the process. In specific embodiments solid-liquid separation unit operations are included in the process following the extraction and following the removal of the extractant solvent. The fish oil is then treated to isolate phospholipids as described above. Thus, the fish oil is mixed with the polar solvent in a vessel appropriate for continuous processing before leading the process stream to a centrifuge likewise suited for continuous operation. The stream of polar solvent containing phospholipids is then led to the removal of polar solvent optionally combined with a drying step, e.g. by treating at increased temperature and decreased pressure. This operation may also be performed continuously, and the polar solvent may be recycled and added to fish oil provided from the prior extraction step. In certain embodiments the mixing and extraction steps are performed at increased temperatures. However, in a specific embodiment, e.g. where the fish material is fish which has not been subjected to heat treatment, all process steps are performed without subjecting the fish material to excessive temperatures, e.g. temperatures above 40° C., at any stage of the process. An integrated process may further comprise analysing the polar fraction and/or the optional concentrated polar fraction for the presence of an excess of polar solvent and controlling the amount polar solvent added to the fish oil or the mixture of polar fraction and fish oil based on the result of the analysis. Thus, the analysis may provide information to a feedback loop allowing adjustment of the amount(s) of polar solvent added in the respective polar solvent extractions to the optimal ratio of polar solvent to fish oil or mixture of polar fraction and fish oil.

It is within the knowledge of the skilled person to design the integrated process for continuous operation in order to isolate phospholipids from fish material when considering the amount of fish material to be processed and the amount of phospholipids contained in the fish material. For example, the skilled person can select reactor vessels, and their required size and capacity, appropriate for continuous operation and calculate the necessary residence times in the vessels and the corresponding material flow rates in the vessels. All steps for which an increased temperature is relevant as outlined above, are preferably performed at increased temperature. This will advantageously minimise the risk of microbial contamination, and further lead to a faster overall process.

BRIEF DESCRIPTION OF THE FIGURES

In the following the invention will be explained in greater detail with the aid of examples of embodiments and with reference to the schematic drawings, in which.

DETAILED DESCRIPTION OF THE INVENTION

The present invention relates to a process for isolation of a phospholipid from a fish oil comprising the steps of:
providing a fish oil containing lipids and phospholipids;

mixing the fish oil with a polar solvent;
centrifuging the mixture of the fish oil and the polar solvent to separate a polar fraction from a lipid fraction;
isolating a phospholipid from the polar fraction.

In another aspect invention relates to a process for producing a polyunsaturated, long-chain fatty acids (PUFA)-enriched fraction from a fish oil comprising the steps of:
providing a fish oil containing PUFA's;
mixing the fish oil with a polar solvent;
centrifuging the mixture of the fish oil and the polar solvent to separate a polar fraction from a lipid fraction;
isolating a PUFA-enriched fraction from the polar fraction.

In the context of the present invention a PUFA is a fatty acid containing more than 18 carbon atoms and two or more unsaturated bonds. Preferred PUFA's are EPA and DHA.

Figure 1:
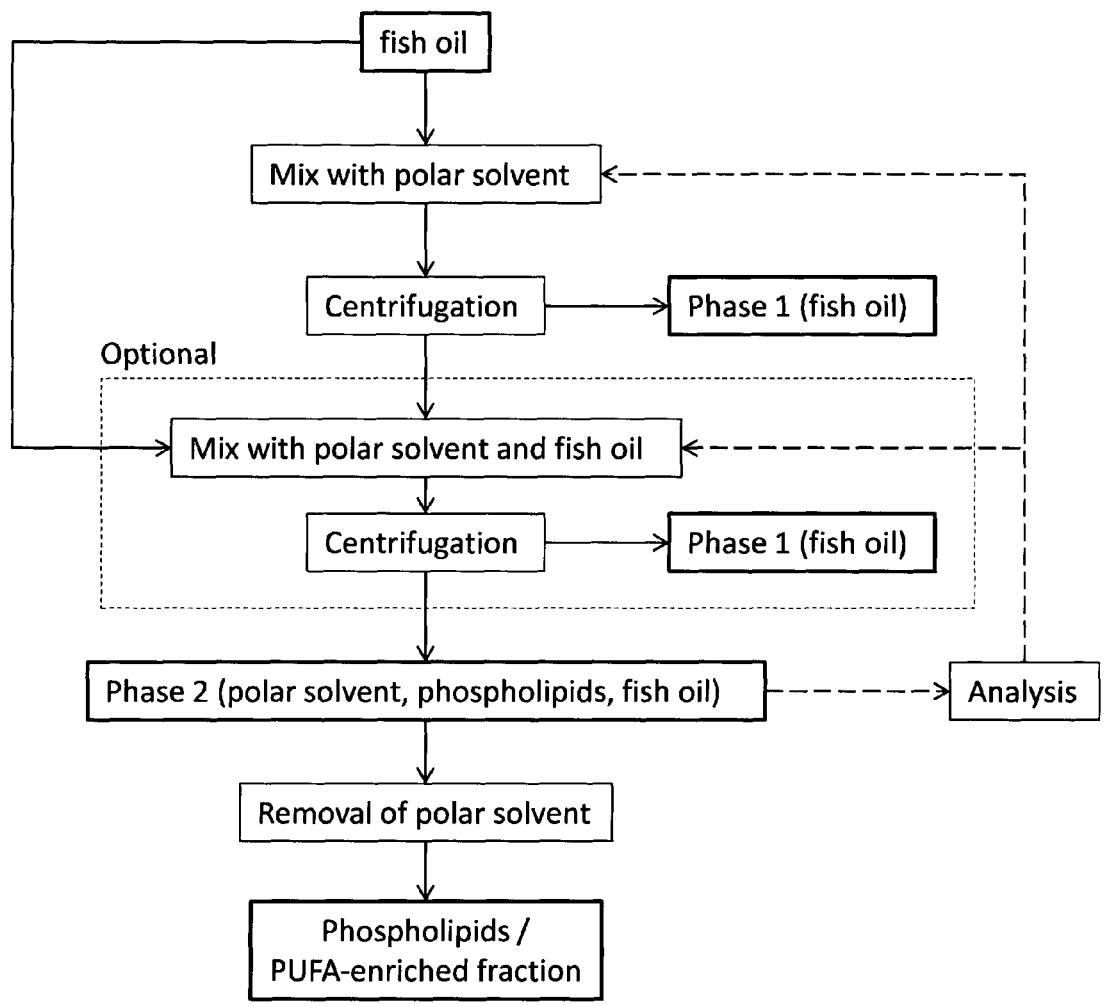
FIG. 1 shows a process diagram of an embodiment of the invention.

A process diagram of the invention is illustrated in FIG. 1. FIG. 1 shows the process with the optional second polar solvent extraction indicated, and furthermore, FIG. 1 illustrates how the result of the analysis for excess polar solvent may be used to control the upstream polar solvent extraction(s).

The fish oil may be provided by:
extracting a fish material with an extractant solvent;
removing the extractant solvent to provide the fish oil;
optionally subjecting the fish oil to a solid-liquid separation.

Figure 2:
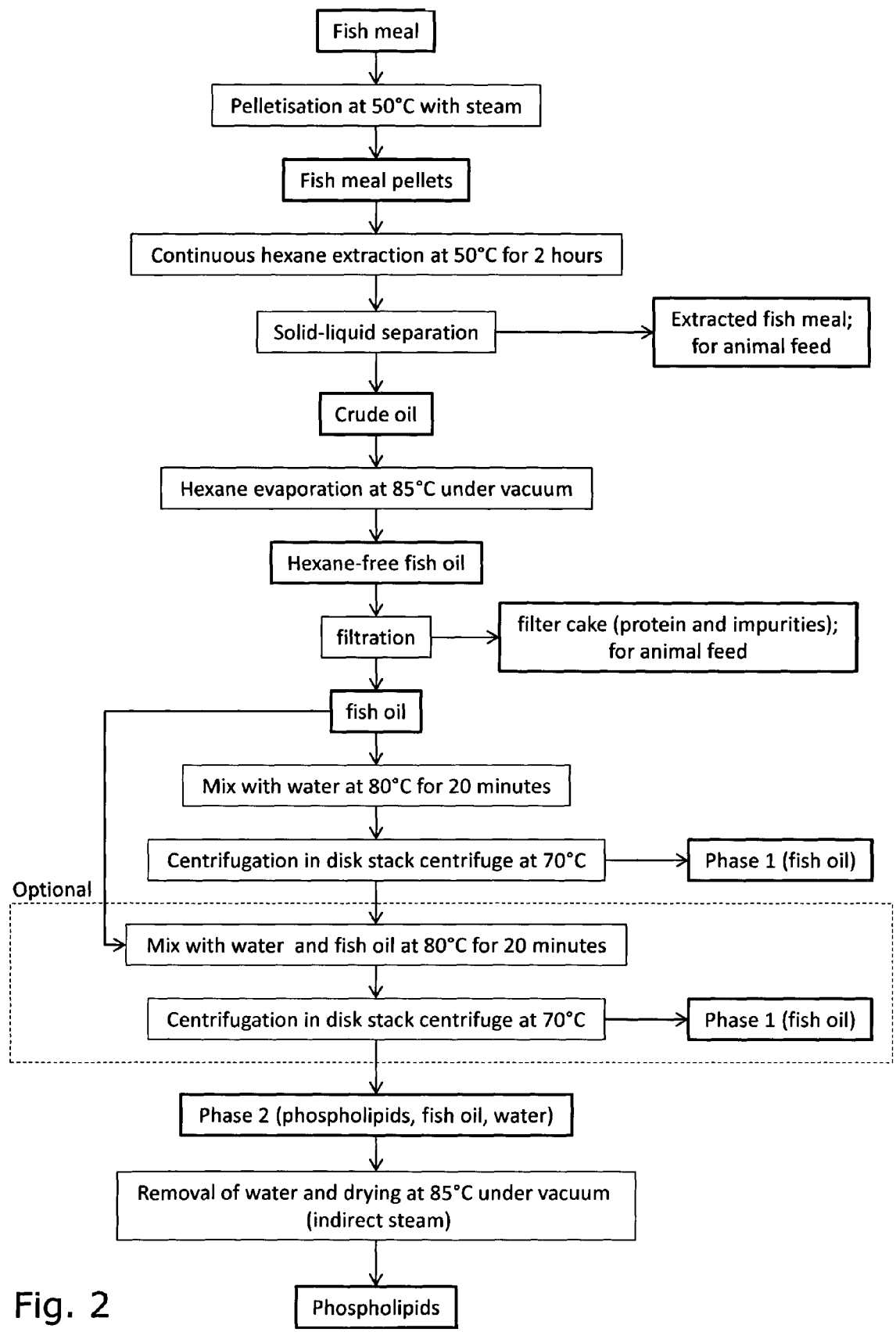
FIG. 2 shows a process diagram of an embodiment of the invention.
Figure 3:
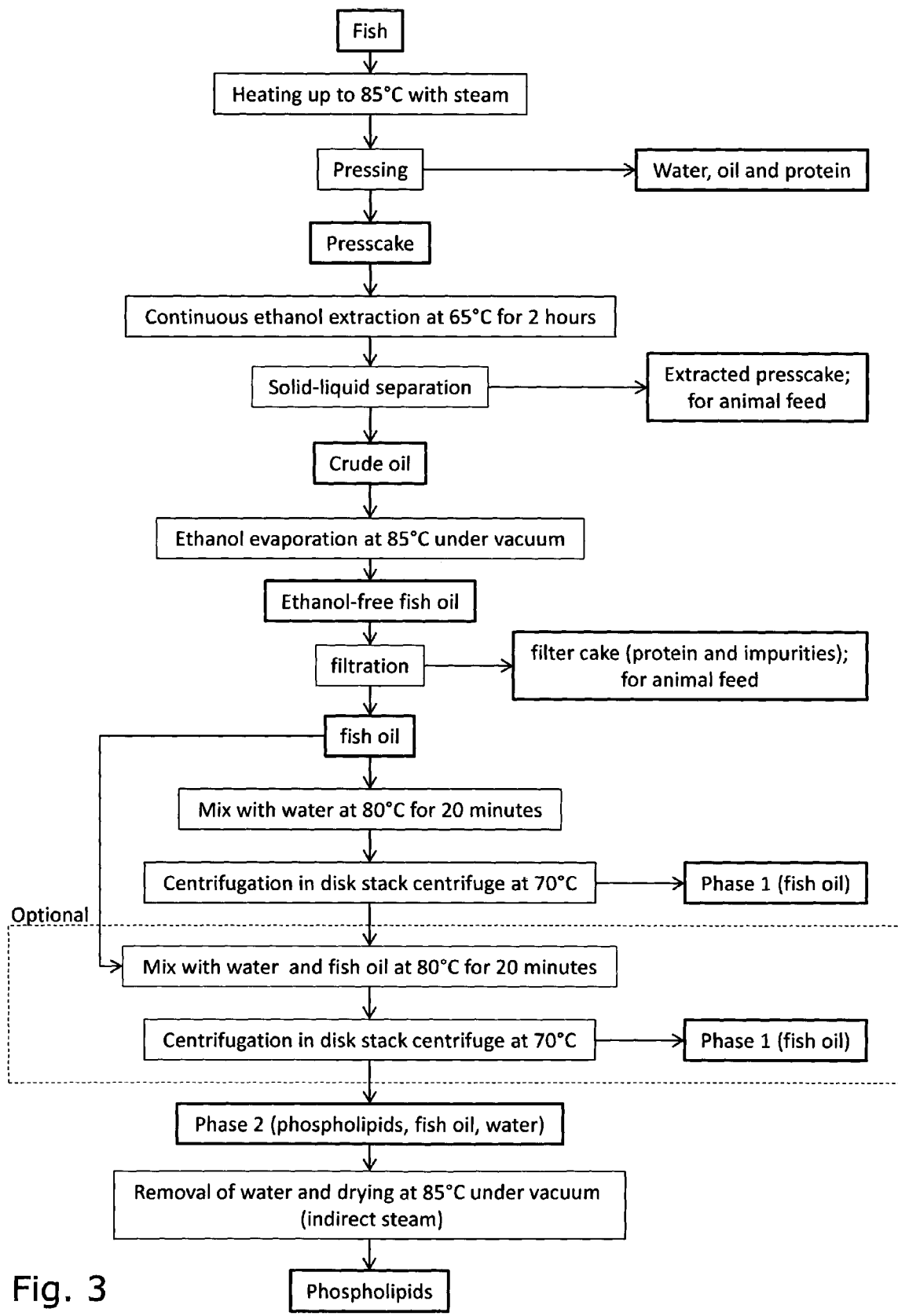
FIG. 3 shows a process diagram of an embodiment of the invention.

Specific embodiments of the processes are illustrated in FIG. 2 and FIG. 3. FIG. 2 and FIG. 3 indicate the optional second polar solvent extractions. The processes in FIG. 2 and FIG. 3 may both provide a phospholipid product or a PUFA-product, and both may be integrated to be performed as integrated continuous processes where e.g. solvent streams are recycled to be used in upstream extraction steps. Further, both processes may comprise analysis steps, as described above, to provide information for use regarding addition of polar solvent in the respective extractions.

The fish oil is mixed with a polar solvent. The "polar solvent" is immiscible with the fish oil, but the polarity of the solvent allows that phospholipids and PUFA's are extracted from the fish oil due to the formation of phospholipid micelles in the polar solvent. Any solvent with this capability is contemplated for use in the process of the invention. In particular, polar solvents typically have a high dielectric constant, such as above 15. A preferred polar solvent is water, e.g. deionised water. The ratio of polar solvent to fish oil will generally be from about 5:95 to about 25:75. The amount of polar solvent to fish oil will typically dependent on the exact nature of the polar solvent. For example, when water is selected as the polar solvent the ratio of water to fish oil may be from about 10:90 to about 20:80. The optimal amount of polar solvent may be determined by analysis of the polar fraction and the result of the analysis may be used to adjust the amount of polar solvent to be mixed with the fish oil. In particular when the process is performed continuously the result of the analysis may be employed in a feed-back loop to optimise the process when it is running. Specific embodiments of the invention thus comprise the step of analysing the polar fraction, or optionally the concentrated polar fraction, for the presence of an excess of polar solvent. The result of the analysis may be used to adjust, in particular during continuous operation, the amount of polar solvent mixed with the fish oil. Thus, for example when a relatively dense polar solvent, such as water, is used the amount of polar solvent to be mixed with the fish oil or the mixture of the polar fraction and the fish oil may be determined by subjecting a sample from the polar fraction to lab scale centrifugation and checking the test tube for the presence of free polar solvent in the bottom of the tube.

The presence of free polar solvent will indicate that an excess amount of polar solvent was present during the step of mixing the fish oil with water. The amount of polar solvent to be added in the continuous process may be adjusted to the minimum excess required which is optimal for the separation.

When the processes of the invention comprise a second polar solvent extraction of the polar fraction as outlined above, the concentrated polar fraction may also be analysed for excess of polar solvent as explained above. The duration of the mixing step should be sufficient to provide a polar fraction, e.g. an aqueous fraction, enriched in phospholipids and PUFA's and a lipid fraction depleted in phospholipids. The mixing may be for any predetermined period of time and the mixing is not limited regarding the temperature. However, the duration of the mixing should be sufficient to separate the phospholipids from the fish oil.

The mixing temperature may be selected to optimise extraction of phospholipids and PUFA's, and in certain embodiments it is generally increased from ambient temperature to a temperature below the boiling point of the polar solvent. For example, when the polar solvent is water the temperature may be from about 50° C. to about 95° C. or higher, such as about 60° C., about 70° C., about 80° C. or about 90° C. An increased temperature may provide a faster extraction of the phospholipids and PUFA's from the fish oil. In another embodiment the mixing temperature is maintained in a range from below ambient, e.g. about 5° C., to moderately increased, e.g. to about 40° C., such as about 10° C., about 20° C. or about 30° C. Certain species of phospholipids and especially PUFA's, may be modified by high temperatures, and in this temperature range it can be ensured that the phospholipids and PUFA's are not modified, e.g. damaged by the high temperature. In particular it may be of interest to keep the temperature as low as possible. In some embodiments all process steps are performed at a low temperature, and in others some steps may be performed at low temperature whereas others are performed at increased temperature. In general, brief exposure of a fish material or a mixture or an extract etc. in a step of the process of the invention to high temperature will not be detrimental to the phospholipids. In particular, a process stream or the phospholipid product may be subjected to pasteurisation without modifying the phospholipids. Thus, any step of the inventive process may also comprise a pasteurisation step. Pasteurisation is well known to the skilled person.

The mixing time will typically be up to about 1 hour, such as about 10 minutes, about 20 minutes, about 30 minutes, about 40 minutes, about 50 minutes or about 60 minutes. In a specific embodiment water is used as the polar solvent, which is mixed with the fish oil at a ratio of 15:85 for about 20 minutes at about 80° C., preferably in a continuous process. This ratio of water to fish oil may also be used in embodiments using other mixing temperatures. Likewise, this ratio is also relevant for other polar solvents.

The mixture, i.e. the two-phase system, with the polar fraction and the lipid fraction is centrifuged to separate the polar fraction from the lipid fraction, optionally at an increased temperature, e.g. at a temperature of about 40° C. to about 75° C., e.g. at about 70° C. In particular, an increased temperature may be used when the preceding mixing step is performed at an increased temperature, and further when subsequent removal of the polar solvent by vacuum distillation is intended, centrifugation at an increased temperature is preferred. Likewise, when the mixing temperature is kept low, as defined above, to ensure that phospholipids are not modified due to heating, it may be of interest to maintain the temperature in this range in the centrifugation step. In general, the polar solvent may be present as drops or droplets in the fish oil. Further, the phospholipids in micellar form in the polar solvent may function as surfactants to create an "oil-in-polar-solvent emulsion", e.g. an oil-in-water emulsion. Any centrifugation operation capable of separating two liquid phases, e.g. in the form of drops or droplets of one phase in the other, may be employed, but it is preferred that a disk stack centrifuge is used. A particularly preferred embodiment employs two consecutive disk stack centrifuges to centrifuge the mixture of the fish oil and the polar solvent, or optionally the mixture of the polar fraction, the polar solvent and the fish oil. In this embodiment the first centrifuge serves to separate water and phospholipids, i.e. the polar fraction or concentrated polar fraction, from the lipid fraction. The subsequent, e.g. serially connected, disk stack centrifuge concentrates the phospholipids in the polar fraction or concentrated polar fraction from the upstream disk stack centrifuge. In a specific set-up the first centrifuge has a distance between the disks of 0.6 mm, and the second centrifuge has a distance between the disks of 0.8 mm.

The polar solvent is subsequently removed from the mixture of the polar fraction e.g. by vacuum distillation. For example, when the polar solvent is water it may be removed by increasing the temperature to be in the range of about 60° C. to about 85° C., e.g. about 80° C. or about 85° C. while reducing the pressure so that the water boils, e.g. while reducing the pressure to about −0.7 bar to about −0.9 bar. The water may thus be removed from the phospholipid fraction, which is further dried, in about 1 hour to about 3 hours. It is also possible to employ a different combination of temperature and pressure, but when the process employs increased temperatures, the temperature and pressure are typically selected such that the water is boiling. Likewise, in embodiments where excessive temperatures are avoided to prevent modification of phospholipids it may be desirable to maintain a moderate temperature when removing the polar solvent. These considerations also apply when other polar solvents are employed. The temperature may advantageously be increased using indirect steam when relevant.

In another embodiment of the process of the invention, fish material is extracted with an extractant solvent to provide fish oil for isolation of phospholipids. In a preferred embodiment the fish material is fish meal, which may be pelletised prior to extraction, e.g. at a temperature of about 50° C., for example with addition of steam to optimise pelletisation. In yet another embodiment, the fish material is a presscake from the production of fish meal. In very broad terms the "presscake" refers to the material obtained after initially heating fish or fish material to coagulate protein, rupture fat depots and liberate oil and physico-chemically bound water, followed by pressing (or optionally centrifugation) to, at least partially, remove liquids from the mass. The presscake may be extracted directly or the presscake may be subjected to disruption or comminution or the like prior to extraction. When presscake is treated according to the process of the invention the fish oil extracted with the extractant solvent comprises a higher content of phospholipids since the neutral oils have been removed during the pressing. This further allows that smaller amounts, e.g. relative to the amount of fish material, of extractant solvent are employed. Presscake is therefore a preferred fish material in the present invention. In a further embodiment, whole fish or parts of fish are extracted with the extractant solvent, specifically the whole fish or parts of fish may be extracted without any prior heat treatment. When the fish material has not been subjected to prior heat treatment, whole fish may be extracted directly, or the whole fish may be subjected to comminution or disruption prior to extraction.

The extraction may take place in any appropriate vessel. In particular, the extraction vessel may be provided with a device to apply shear stress to the mixture of the fish material and the extractant solvent, e.g. the vessel or extractor may be equipped with stirrer blades or the like.

In the context of the present invention, the term "extractant solvent" refers to any solvent that may extract a lipid fraction, e.g. fish oil or phospholipids and PUFA's, from a fish material. Typical extractant solvents comprise apolar solvents, such as alkanes, e.g. pentane, hexane, heptane, octane etc., and aromatic hydrocarbons, e.g. benzene, toluene, and the like. An apolar solvent may also be referred to as a "non-polar solvent". Hydrocarbon solvents comprising heteroatoms may also be employed as extractant solvent, as long as the hydrocarbon solvent may extract a lipid fraction comprising phospholipids from a fish material. The extractant solvent is preferably liquid at ambient temperature and pressure. A preferred extractant solvent is hexane, in particular isohexane. It is noted that in the context of the present invention supercritical carbon dioxide is also contemplated for use as an extractant solvent. Other relevant extractant solvents are alcohols, such as methanol, ethanol, e.g. 96% ethanol in water, propanol, isopropanol or butanol, optionally mixed with water, ketones, such as acetone, ethers or esters etc. It is also possible to employ mixtures of two or more extractant solvents. In a specific embodiment the extractant solvent is ethanol or a mixture of ethanol and water, e.g. with a concentration of ethanol in water from 10% up to 30%, or with a concentration of ethanol in water above 70%, for example the concentration of ethanol may be about 80% or about 85%. In a preferred embodiment the extractant solvent is 96% ethanol. When 96% ethanol is employed to extract presscake the ratio of ethanol to presscake is typically from about 1:2 to about 1:5, preferably about 1:3. The extraction time may be about 2 hours, at the temperature about 65° C.

The extraction may be performed at ambient or lower temperature, or it may be performed at an increased temperature. For example, in one embodiment the extraction may be performed at a temperature in the range of about 40° C. to about 70° C., such as about 40° C., about 50° C., about 60° C., or about 70° C. In another embodiment the extraction with the extractant solvent is performed at a low temperature of about 5° C. to about 40° C., e.g. about 10° C., at about 20° C. or about 30° C. When the extraction is performed at low temperature other process steps may also be performed at low temperature. Extraction at increased temperature can increase the extraction efficiency, and in particular the temperature may be controlled to increase the efficiency of extraction of phospholipids, which may be extracted selectively, e.g. extraction at about 50° C. to about 60° C. when the extractant solvent is isohexane will provide optimal extraction of phospholipids using this solvent. The extraction temperature is preferably below the boiling point of the extractant solvent. The same considerations for employing a low temperature in the step of mixing fish oil with the polar solvent generally apply also for extraction with the extractant solvent and any subsequent steps.

The duration of the extraction is not limited and may be selected to provide sufficient extraction of lipids, especially phospholipids, from the fish material. For example, the duration may be from about 0.5 hours to about 10 hours or more, e.g. about 1 hours, about 2 hours, about 3 hours, about 4 hours, about 5 hours, about 6 hours, about 7 hours, about 8 hours, about 9 hours or about 10 hours. Extraction with isohexane may be performed with a duration of e.g. about 2 hours.

Extraction of the fish material with the extractant solvent will result in a liquid fraction comprising the lipids, including also polar lipids, such as phospholipids and PUFA's, from the fish material. The liquid phase comprising the lipids and the extractant solvent may be referred to as an "extract". This extract may be subjected to a solid-liquid separation to remove solid debris, e.g. extracted fish material, from the liquid phase with the phospholipids. This liquid phase may also be referred to as a "crude oil". Any appropriate solid-liquid separation operation may be employed, for example, sieving, filtration, centrifugation.

The extractant solvent can be removed from the crude oil or the extract using any appropriate method. In particular, the extractant solvent may be removed from the crude oil or the extract using increased temperature and decreased pressure (referred to in the context of the invention as "vacuum distillation"). For example, isohexane may be removed by increasing the temperature to about 70° C. to about 90° C., e.g. about 85° C. under a reduced pressure (e.g. under "vacuum") of about 5 mbar to about 50 mbar. Under these conditions isohexane may be removed in about 10 minutes to about 20 minutes. Removal of the extractant solvent from the extract or crude oil will provide a fish oil comprising both polar and non-polar lipids from the fish material. The fish oil is preferably free of extractant solvent, e.g. the fish oil contains less than 10 ppm extractant solvent, such as less than 5 ppm or less than 2 ppm extractant solvent. The extractant solvent is preferably recycled in the process by adding to fish material to be processed according to the invention.

The fish oil may be subjected to a solid-liquid separation, such as filtration to remove residual protein and other impurities. For example, the fish oil may be subjected to a first filtration to remove crude material followed by a finer filtration step to remove fines.

In an embodiment of the invention the processing of fish material to fish oil will result in phospholipids with reduced contents of unwanted contaminants. For example, the phospholipids will comply with standards of the European Union regarding concentrations of contaminants.

In a specific embodiment, an integrated process is set up as a continuous process, in which about 10 tonnes/hour of fish material is extracted with about 15 tonnes/hour of isohexane as explained above. Removal of the isohexane yields about 1.5 tonnes/hour of fish oil from which phospholipids are isolated according to the invention. Thus, the process is evidently scaleable to a large industrial scale.

The invention will now be explained in the following non-limiting examples. As will be evident to the skilled person variations are possible without deviating from the invention.

COMPARATIVE EXAMPLE

A batch of fish oil was prepared from sprat according to a prior art technique. The composition of the fish oil thus prepared is summarised in Table 1.

TABLE 1

Fatty acid composition of fish oil prepared according to the prior art.

| Fatty acid | Danish sprat % |
|---|---|
| C14:0 | 6.4 |
| C15:0 | 0.8 |
| C16:0 | 18.9 |
| C16:1 | 5.7 |
| C18:0 | 3.1 |

TABLE 1-continued

Fatty acid composition of fish oil prepared according to the prior art.

| Fatty acid | Danish sprat % |
|---|---|
| C18:1 | 18.5 |
| C18:2 | 2.2 |
| C18:3 | 1.7 |
| C18:4n3 | <0.01 |
| C20:1 | 6.8 |
| C20:4n6 | 0.5 |
| C20:5n3 (EPA) | 8.9 |
| C22:1 | 6.9 |
| C22:5n3 (DPA) | 0.9 |
| C22:6n3 (DHA) | 13.2 |

Example 1

A batch of 500 tonnes of fish meal was treated in a continuous plant according to the invention. The raw material fish meal was extracted with isohexane as an extractant solvent following initial pelletisation. After evaporation of the isohexane the fish oil was extracted with water as a polar solvent before centrifugation in a disk stack centrifuge. Isohexane removed from the fish oil was recycled in the process. The phospholipids were finally isolated from the polar fraction by drying to remove the water. The parameter values employed in the process are summarised in Table 2 below.

TABLE 2

Process parameters for phospholipid preparation

| Unit operation | Reaction conditions | Product |
|---|---|---|
| Pelletisation | 50° C. | |
| Extraction with isohexane | 2 hours 52° C. | |
| Sieving to remove dry matter | | |
| Isohexane removal (evaporation) | 10 mbar 85° C. | 60 tonnes of fish oil with phospholipids |
| Filtering and polishing | | |
| Mixing with water at a water:fish oil ratio of 15:85 | 50° C. | |
| Extraction under agitation | 20 minutes 60° C. | |
| Centrifugation in a disk stack centrifuge | | Polar fraction with phospholipids; Lipid fraction of phospholipid depleted fish oil |
| Phospholipid isolation (water removal to 1% moisture) | 2 hours 5 mbar 85° C. | 10 tonnes of product containing 40% phospholipids and 60% fish oil with 26% EPA + DHA |

The dry matter occurring after the solid-liquid separation steps represented protein products of the invention, and the lipid fraction from the centrifugation represented a phospholipid depleted fish oil product of the invention. The polar fraction with phospholipids and the product obtained from this fraction after water removal represented different embodiments of the phospholipid product obtainable in the process of the invention. The composition of the fish oil provided by the extraction is compared to the composition of the final product in Table 3 and Table 4 below.

TABLE 3

Fatty acid composition of fish oil prepared according to an embodiment of the invention

| Fatty acid | Extracted fish oil % | Final product % |
|---|---|---|
| C14:0 | 5.5 | 4.2 |
| C15:0 | 0.5 | 0.5 |
| C16:0 | 16.8 | 18.8 |
| C16:1 | 10.2 | 6.6 |
| C18:0 | 3.1 | 4.9 |
| C18:1 | 9.7 | 10.9 |
| C18:2n6 | 2.1 | 2.0 |
| C18:3n6 | 0.5 | 0.2 |
| C18:3n3 | 1.1 | 0.9 |
| C18:4n3 | 2.9 | 1.8 |
| C20:1 | 3.4 | 1.5 |
| C20:4n6 | 0.7 | 1.0 |
| C20:5n3 (EPA) | 12.3 | 13.5 |
| C22:1 | 0.2 | 1.4 |
| C22:5n3 (DPA) | 0.8 | 1.3 |
| C22:6n3 (DHA) | 15.4 | 19.3 |
| C24:1 | 0.8 | 0.1 |

TABLE 4

Phospholipid composition of fish oil prepared according to an embodiment of the invention

| Phospholipids | Extracted fish oil | Final product |
|---|---|---|
| Phosphatidylcholine | 6.3 | 16.1 |
| Lyso-phosphatidylcholine | 1.2 | 5.4 |
| Phosphatidylinositol | 0.7 | 1.8 |
| Spingomyelin | 1.6 | 3.5 |
| Phosphathidylethanolamin | 1.8 | 4.5 |
| Lyso-phosphathidylethanolamin | 0.5 | 1.4 |
| Acylphosphatidylethanolamine | 2.1 | 6.3 |
| Phosphatic acid | 0.3 | 0.9 |
| Lyso-phosphatic acid | 10.1 | 0.2 |
| Total phospholipids | 16.6 | 44.3 |

It is evident from Table 3 and Table 4 that the process of the invention provided a product enriched in phospholipids, and that the process of the invention further provided a product enriched in PUFA's compared to the process of the prior art.

Example 2

Fish were heated up to 85° C. and pressed to provide a presscake, which was subjected to continuous ethanol (96% ethanol in water) extraction for two hours at 65° C. The extracted presscake was subjected to solid-liquid separation to separate a crude oil containing ethanol from the extracted presscake. Ethanol was evaporated at 85° C. under vacuum to provide an ethanol-free fish oil, which was filtered to remove debris from the fish oil. The fish oil was then extracted with water as a polar solvent at 80° C. for 20 minutes followed by treatment in a disk stack centrifuge at 70° C. The polar fraction from the centrifugation was mixed with fish oil and water at a ratio of 48% polar fraction to 50% fish oil and 2% water, and the mixture was extracted at 80° C. for 20 minutes. The extracted mixture was then centrifuged in a disk stack centrifuge at 70° C. before removal of the water by drying at 85° C. under vacuum. This yielded a product enriched in phospholipids and PUFA's. The composition of the fish oil provided by the ethanol extraction is compared to the composition of the final product in Table 5 and Table 6 below.

TABLE 5

Fatty acid composition of fish oil prepared according to an embodiment of the invention

| Fatty acid | Ethanol extracted fish oil % | Final product % |
|---|---|---|
| C14:0 | 1.9 | 1.6 |
| C15:0 | 0.2 | 0.5 |
| C16:0 | 22.7 | 18.8 |
| C16:1 | 3.2 | 4.5 |
| C18:0 | 4.8 | 4.9 |
| C18:1 | 12.6 | 10.9 |
| C18:2n6 | 0.6 | 1.5 |
| C18:3 | 0.4 | 0.2 |
| C18:4n3 | 0.6 | 1.8 |
| C20:1 | 1.6 | 1.5 |
| C20:4n6 | 0.8 | 1.0 |
| C20:5n3 (EPA) | 9.7 | 10.5 |
| C22:1 | 1.8 | 1.4 |
| C22:6n3 (DHA) | 19.7 | 24.3 |

TABLE 6

Phospholipid composition of fish oil prepared according to an embodiment of the invention

| Phospholipids | Ethanol extracted fish oil | Final product |
|---|---|---|
| Phosphatidylcholine | 9.5 | 24.2 |
| Lyso-phosphatidylcholine | 1.3 | 3.3 |
| Phosphatidylinositol | 0.9 | 2.3 |
| Spingomyelin | 0.9 | 2.3 |
| Phosphathidylethanolamin | 1.4 | 3.6 |
| Lyso-phosphathidylethanolamin | 0.3 | 0.8 |
| Acylphosphatidylethanolamine | 0.8 | 2.1 |
| Phosphatic acid | 0.1 | 0.3 |
| Lyso-phosphatic acid | 0.1 | 0.3 |
| Total phospholipids | 15.6 | >40 |

It is evident from Table 5 and Table 6 that the process of the invention provided a product enriched in phospholipids, and that the process of the invention further provided a product enriched in PUFA's compared to the process of the prior art.

The invention claimed is:

1. A process for producing a polyunsaturated, long-chain fatty acids (PUFA)-enriched phospholipid product from a marine oil comprising the steps of:
   providing a marine oil containing lipids and phospholipids;
   mixing the marine oil with a polar solvent, wherein the ratio of polar solvent to marine oil is about 5:95 to about 25:75;
   centrifuging the mixture of the marine oil and the polar solvent to separate a polar fraction from a lipid fraction;
   mixing the polar fraction with the polar solvent and marine oil, which has not been treated in the step of mixing with the polar solvent to provide a mixture comprising up to about 5% polar solvent; about 25% to about 75% marine oil and polar fraction to balance;
   separating the mixture into a concentrated polar fraction and a lipid fraction; and
   isolating the PUFA-enriched phospholipid product from the concentrated polar fraction.

2. The process according to claim 1, wherein the step of providing the marine oil comprises:
   extracting a marine animal material with an extractant solvent;
   removing the extractant solvent to provide the marine oil;

optionally subjecting the marine oil to a solid-liquid separation.

3. The process according to claim 1, wherein the step of separating comprises centrifuging the mixture to separate a concentrated polar fraction from a lipid fraction.

4. The process according to claim 1, wherein the polar solvent is water.

5. The process according to claim 1, wherein phospholipids of the PUFA-enriched phospholipid product are intact.

6. The process according to claim 1 further comprising analysing the polar fraction or the concentrated polar fraction for the presence of an excess of polar solvent.

7. The process according to claim 1 further comprising centrifuging the concentrated polar fraction to concentrate phospholipids and the PUFA's therein.

8. The process according to claim 1, wherein the marine animal material is derived from fish meal or a presscake from a fish meal production.

9. The process according to claim 1, wherein the marine animal material is derived from one or more of sand eel (*Hyperoplus* sp., *Gymnammodytes* sp. or *Ammodytes* sp., e.g. *Hyperoplus lanceolatus*), sprat (*Sprattus sprattus*), herring (*Clupea* sp., e.g. *Clupea harengus*), anchovy (*Engraulis* sp., e.g. *Engraulis ringens*), boarfish (*Capros aper*), Norway pout (*Trisopterus esmarkii*), Capelin (*Malotus villosus*), Blue Whiting (*Micromesistius poutassou*), or Jack Mackerel (*Trachurus murphyi*), krill, shrimps, crabs, lobsters, mantis shrimp, woodlice, or sandhoppers.

10. The process according to claim 1, wherein the marine animal material is derived from marine animals which have not been subjected to heat treatment.

11. The process according to claim 1, wherein the step of mixing the marine oil or the mixture of the polar fraction and the marine oil with the polar solvent is performed at an increased temperature.

12. The process according to claim 1, wherein the step of mixing the marine oil or the mixture of the polar fraction and the marine oil with the polar solvent is performed at a temperature of about 5° C. to about 40° C.

13. The process according to claim 1, wherein the isolation of the PUFA-enriched phospholipid product from the polar fraction or the concentrated polar fraction comprises vacuum distillation of the polar fraction to remove the polar solvent.

14. The process according to claim 1, wherein the centrifugation is performed in a disk stack centrifuge.

15. The process according to claim 2, wherein the extractant solvent is an apolar solvent, e.g. hexane, ethanol or a mixture of ethanol and water.

16. The process according to claim 2, wherein the extractant solvent is 96% ethanol, and the ratio of ethanol to marine animal material is from about 1:2 to about 1:5, preferably about 1:3.

17. The process according to claim 11, wherein the temperature is 65° C.

18. The process according to claim 2, wherein the extraction with the extractant solvent is performed at an increased temperature.

19. The process according to claim 2, wherein the extraction with the extractant solvent is performed at a temperature of about 5° C. to about 40° C.

20. The process according to claim 1, wherein the process is performed under continuous operation.

* * * * *

UNITED STATES PATENT AND TRADEMARK OFFICE
CERTIFICATE OF CORRECTION

Page 1 of 1

PATENT NO. : 8,828,447 B2
APPLICATION NO. : 14/110525
DATED : September 9, 2014
INVENTOR(S) : Soerensen et al.

It is certified that error appears in the above-identified patent and that said Letters Patent is hereby corrected as shown below:

On the title page

Item (73): "Polar Amega A/S" should be changed to --Polar Omega A/S--.

Signed and Sealed this
Fourteenth Day of April, 2015

Michelle K. Lee
*Director of the United States Patent and Trademark Office*